(12) United States Patent
Knight et al.

(10) Patent No.: US 8,760,875 B2
(45) Date of Patent: Jun. 24, 2014

(54) HIGH DENSITY DIGITAL SIGNAL CROSS-CONNECT SYSTEM

(75) Inventors: Paul Allan Knight, Spokane, WA (US); Bradley Fuller, Nine Mile Falls, WA (US); Grayling A. Love, II, Liberty Lake, WA (US)

(73) Assignee: Telect, Inc., Liberty Lake, WA (US)

( * ) Notice: Subject to any disclaimer, the term of this patent is extended or adjusted under 35 U.S.C. 154(b) by 796 days.

(21) Appl. No.: 12/950,812

(22) Filed: Nov. 19, 2010

(65) Prior Publication Data

US 2011/0122648 A1    May 26, 2011

Related U.S. Application Data

(60) Provisional application No. 61/264,215, filed on Nov. 24, 2009.

(51) Int. Cl.
*H05K 5/00* (2006.01)

(52) U.S. Cl.
USPC .......................................... 361/731; 361/728

(58) Field of Classification Search
USPC ................. 361/825–826, 728–732, 686, 727; 439/668, 49; 379/325–329
See application file for complete search history.

(56) References Cited

U.S. PATENT DOCUMENTS

| | | |
|---|---|---|
| 4,002,399 A | 1/1977 | Deitch et al. |
| 4,017,770 A | 4/1977 | Valfre |
| 4,213,013 A | 7/1980 | Perna et al. |
| 4,221,445 A | 9/1980 | Fleischhacker et al. |
| 4,273,966 A | 6/1981 | Briggs, Jr. et al. |
| 4,286,121 A | 8/1981 | Olszewski et al. |
| 4,312,552 A | 1/1982 | Hughes et al. |
| 4,423,466 A | 12/1983 | Beun |
| 4,426,558 A | 1/1984 | Tanaka et al. |
| 4,514,030 A | 4/1985 | Triner et al. |
| 4,595,799 A | 6/1986 | Krob et al. |
| 4,609,242 A | 9/1986 | Kemppainen |
| 4,618,194 A | 10/1986 | Kwilos |
| 4,628,159 A | 12/1986 | Deitch et al. |
| 4,705,921 A | 11/1987 | Rabey et al. |
| 4,737,985 A | 4/1988 | De Luca et al. |
| 4,749,968 A | 6/1988 | Burroughs |
| 4,768,961 A | 9/1988 | Lau |
| 4,770,639 A | 9/1988 | Lau |
| 4,773,867 A | 9/1988 | Keller et al. |
| 4,796,289 A | 1/1989 | Masor |

(Continued)

FOREIGN PATENT DOCUMENTS

| | | |
|---|---|---|
| EP | 0243296 | 10/1987 |
| EP | 0364658 | 4/1990 |
| GB | 2111770 | 7/1983 |
| SU | 1582238 | 7/1990 |

*Primary Examiner* — Hung S Bui
(74) *Attorney, Agent, or Firm* — Lee & Hayes, PLLC (57) ABSTRACT

A telecommunication panel may comprise a chassis configured to receive insertable Digital Signal Cross-connect (DSX) modules and a backplane connected to the chassis. The DSX module is compact to fit into the telecommunication panel. A ratio of the number of the insertable 6-port DSX modules over the backplane surface area at least about 0.37 modules per square inch is achieved. The DSX module may include a printed circuit board and a light emitting diode (LED) light pipe on the printed circuit board to minimize the width of the DSX module. The DSX module may be inserted into the telecommunication panel horizontally or vertically so that the telecommunication panel receives a maximum number of DSX modules.

27 Claims, 6 Drawing Sheets

(56) References Cited

U.S. PATENT DOCUMENTS

| | | | |
|---|---|---|---|
| 4,797,114 A | 1/1989 | Lau | |
| 4,800,462 A | 1/1989 | Zacher et al. | |
| 4,811,169 A | 3/1989 | De Luca et al. | |
| 4,815,104 A | 3/1989 | Williams et al. | |
| 4,820,200 A | 4/1989 | Lau | |
| 4,821,146 A | 4/1989 | Behrens et al. | |
| 4,861,281 A | 8/1989 | Warner | |
| 4,874,317 A | 10/1989 | Lau | |
| 4,941,165 A | 7/1990 | Rademacher et al. | |
| 4,975,087 A | 12/1990 | Williams et al. | |
| 5,078,624 A | 1/1992 | Burroughs et al. | |
| 5,178,554 A | 1/1993 | Siemon et al. | |
| 5,178,558 A | 1/1993 | Knox et al. | |
| 5,209,678 A | 5/1993 | Allen et al. | |
| 5,214,673 A | 5/1993 | Morgenstern et al. | |
| 5,233,501 A | 8/1993 | Allen et al. | |
| 5,265,156 A | 11/1993 | Eason et al. | |
| 5,272,277 A | 12/1993 | Humbles et al. | |
| 5,281,163 A | 1/1994 | Knox et al. | |
| 5,315,488 A | 5/1994 | Le Gallo et al. | |
| 5,393,249 A | 2/1995 | Morgenstern et al. | |
| 5,432,847 A | 7/1995 | Hill et al. | |
| 5,439,395 A | 8/1995 | Laukzemis | |
| 5,456,608 A | 10/1995 | Rogers et al. | |
| 5,467,062 A | 11/1995 | Burroughs | |
| 5,482,469 A | 1/1996 | Seiceanu et al. | |
| 5,495,524 A | 2/1996 | Gunell | |
| 5,536,981 A | 7/1996 | Sato et al. | |
| 5,546,282 A | 8/1996 | Hill et al. | |
| 5,552,962 A | 9/1996 | Feustel et al. | |
| 5,588,869 A | 12/1996 | Jensen et al. | |
| 5,634,822 A * | 6/1997 | Gunell | 439/668 |
| 5,639,261 A | 6/1997 | Rutkowski et al. | |
| 5,669,779 A | 9/1997 | Galloway et al. | |
| 5,685,741 A | 11/1997 | Dewey et al. | |
| 5,701,380 A | 12/1997 | Larson et al. | |
| 5,734,306 A | 3/1998 | Jantunen et al. | |
| 5,879,197 A | 3/1999 | Dewey | |
| 5,903,829 A | 5/1999 | Anderson et al. | |
| 5,909,155 A | 6/1999 | Anderson et al. | |
| 5,913,701 A | 6/1999 | Olson et al. | |
| 6,587,354 B1 * | 7/2003 | Kutsch et al. | 361/788 |
| 6,632,106 B2 * | 10/2003 | Musolf et al. | 439/668 |
| 7,554,818 B2 * | 6/2009 | Thom | 361/796 |
| 2002/0182932 A1 * | 12/2002 | Petrie et al. | 439/540.1 |

\* cited by examiner

HIGH DENSITY DIGITAL SIGNAL CROSS-CONNECT SYSTEM

CROSS-CONNECT SYSTEM

This application claims the benefit of U.S. Provisional Application No. 61/264,215 filed on Nov. 24, 2009, which is incorporated by reference herein in its entirety.

BACKGROUND

Telecommunication cross-connect jack panels provide front access to telecommunication circuits for temporary rerouting, repairing, and circuit monitoring. As opposed to directly hard-wiring telecommunication equipment, a Digital Signal Cross-connect ("DSX") system allows for connected equipment to terminate at one or more central locations. This allows for easier adding, removing or rearranging of circuit connections among the equipment. Among other benefits, DSX offers the ability to test, monitor and repair equipment that is terminated at the DSX central location.

A central DSX location typically includes one or more telecommunication racks, which are referred to as bays when loaded with DSX equipment. Racks are designed to hold one or more chassis, panels, terminal strips, terminal blocks, test and maintenance equipment, active equipment (e.g., radios, servers, etc.), and/or other telecommunications equipment.

An important consideration in telecommunication equipment is circuit density. Most central telecommunication locations have limited space. Therefore, there is a need to reduce the size of telecommunication equipment, and install as much telecommunication equipment as possible in a relatively small space at a central telecommunication location.

SUMMARY

This summary is provided to introduce aspects of a telecommunication apparatus and a Digital Signal Cross-connect (DSX) module, which are further described below in the Detailed Description. This summary is not intended to identify essential features of the claimed subject matter, nor is it intended for use in determining the scope of the claimed subject matter.

In one aspect, a telecommunication apparatus may comprise a chassis configured to receive insertable DSX modules, a plurality of 6-port DSX modules received in the chassis and a backplane connected to the chassis.

In another aspect, a ratio of the number of the insertable 6-port DSX modules to the backplane surface area is at least about 0.37 modules per square inch.

In one aspect, the module may have a substantially planar module face, a substantially planar printed circuit board connected to the module face with the printed circuit board being substantially perpendicular to the module face. The module may also include jacks on the module face wherein the printed circuit board is in parallel to a top surface of the chassis.

In another aspect, a DSX module may also comprise a light emitting diode (LED) on the printed circuit board, a cover lens disposed in the module face and a light pipe interposed between the LED and the cover lens to transmit light from the LED to the module face.

In another aspect, each of the DSX modules may further comprise a Deutsches Institut für Normung (DIN) connector mounted to the printed circuit board.

In another aspect, the DSX module may feature a substantially planar module face and a set of jacks on the module face, wherein the set of jacks is parallel to the top surface of the chassis.

In yet another aspect, the chassis may have a top surface comprising a slot configured to receive an insertable designation card wherein the designation card is slidably received in the chassis slot.

In another aspect, the chassis may have a height of about 6 inches and a width of about 23 inches.

In yet another aspect, the chassis may be configured to receive about 48 modules. In another aspect, the chassis may be configured to receive about 24 modules.

In another aspect, a telecommunication apparatus with a chassis height of about 6 inches is designed to receive at least 48 insertable DSX modules.

In another aspect, the chassis has about 6 columns wherein each column is configured to receive about 8 insertable 6-port DSX modules. This aspect may also feature a backplane with a width of about 23 inches.

In yet another aspect, a DSX module may include a light emitting diode (LED) pipe to minimize the width of the DSX module. The DSX module may include a substantially planar module face, a substantially planar printed circuit board connected to the module face with the printed circuit board being substantially perpendicular to the module face. An LED is disposed on the printed circuit board, a cover lens is disposed in the module face, and a light pipe is interposed between the LED and the cover lens to transmit light from the LED to the module face.

In still another aspect, a telecommunication apparatus is designed to receive 24 insertable DSX modules. A ratio of the number of the insertable 6-port DSX modules to the backplane surface area is at least about 0.39 modules per square inch, in one example.

In another aspect, the chassis has a height of about 3.5 inches and a width of 19 inches.

While described individually, the foregoing aspects are not mutually exclusive and any number of the aspects may be present in a given implementation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, there is an increasing demand for compact telecommunication panels to provide front access to telecommunication circuits for temporary rerouting, repairing, and circuit monitoring. Also, there is an increasing demand for compact Digital Signal Cross-connect (DSX) modules so that more DSX modules may be installed in a telecommunication panel.

This disclosure relates to compact designs of telecommunication panels and DSX modules. Two embodiments of high density telecommunication panels are disclosed. Both achieve a density of at least about 0.37 modules per square inch. In one embodiment, the DSX modules are inserted into the telecommunication panel horizontally. In another embodiment, the DSX modules are inserted into the telecommunication panel vertically. Also, in some embodiments, to reduce the size of a DSX module, a light-emitting diode (LED) light pipe is added to the DSX module.

Illustrative Telecommunication Panel and DSX Modules

Figure 1:
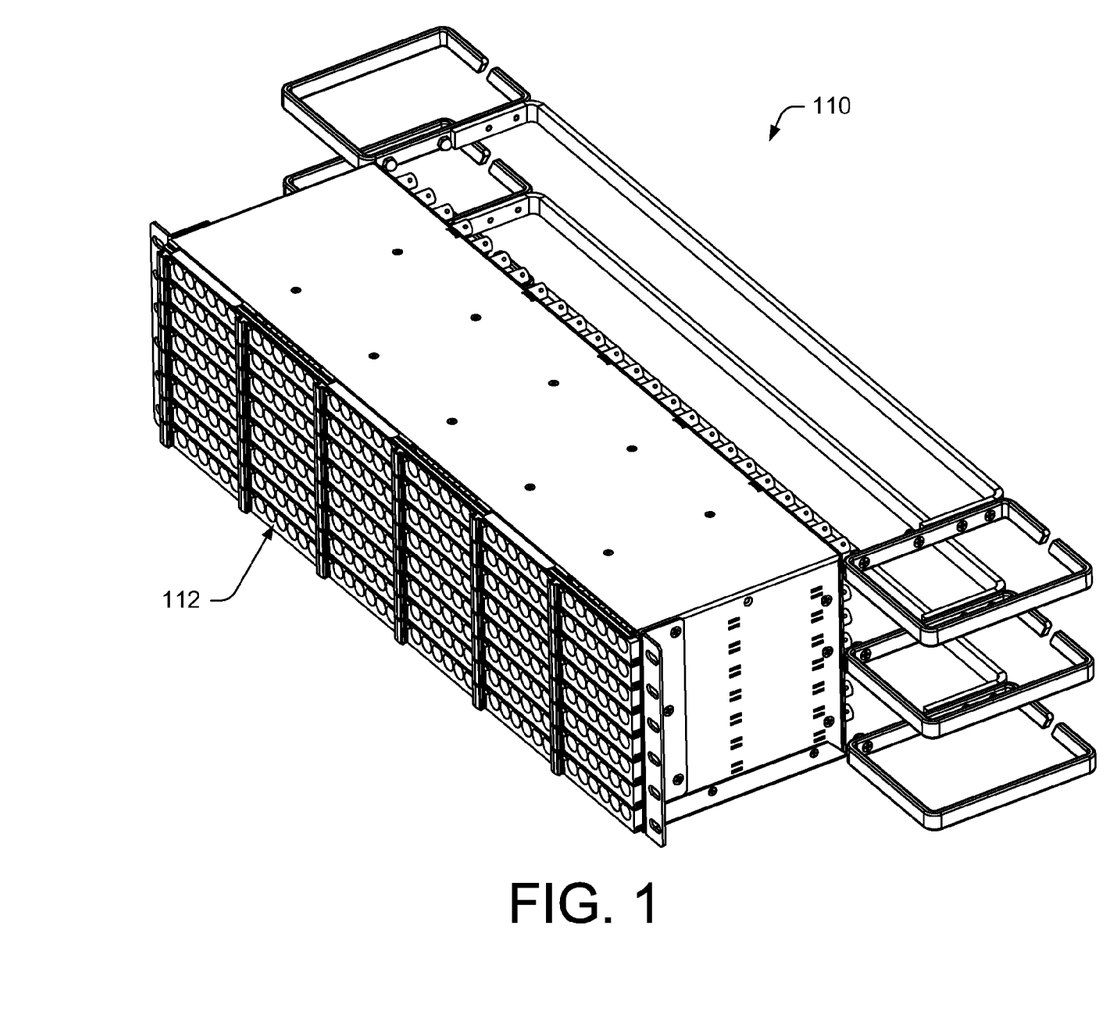
FIG. 1 is a schematic diagram showing an illustrative telecommunication panel with 48 Digital Signal Cross-connect (DSX) modules installed.

FIG. 1 is a schematic diagram showing an illustrative telecommunication panel 110 with 48 Digital Signal Cross-connect (DSX) modules 112 installed for terminating and transparently cross connecting various telecommunication equipment. The modules 112 enable a user to test, monitor, repair, and maintain other telecommunication equipment, by utilizing a patch cord to isolate any one of the telecommunication equipment and reroute it from the front of the telecommunication panel 110 to a different module for interconnection. Also, the telecommunication panel 110 and the modules 112 may be simply used for regular interconnection of other telecommunication equipment.

Figure 2:
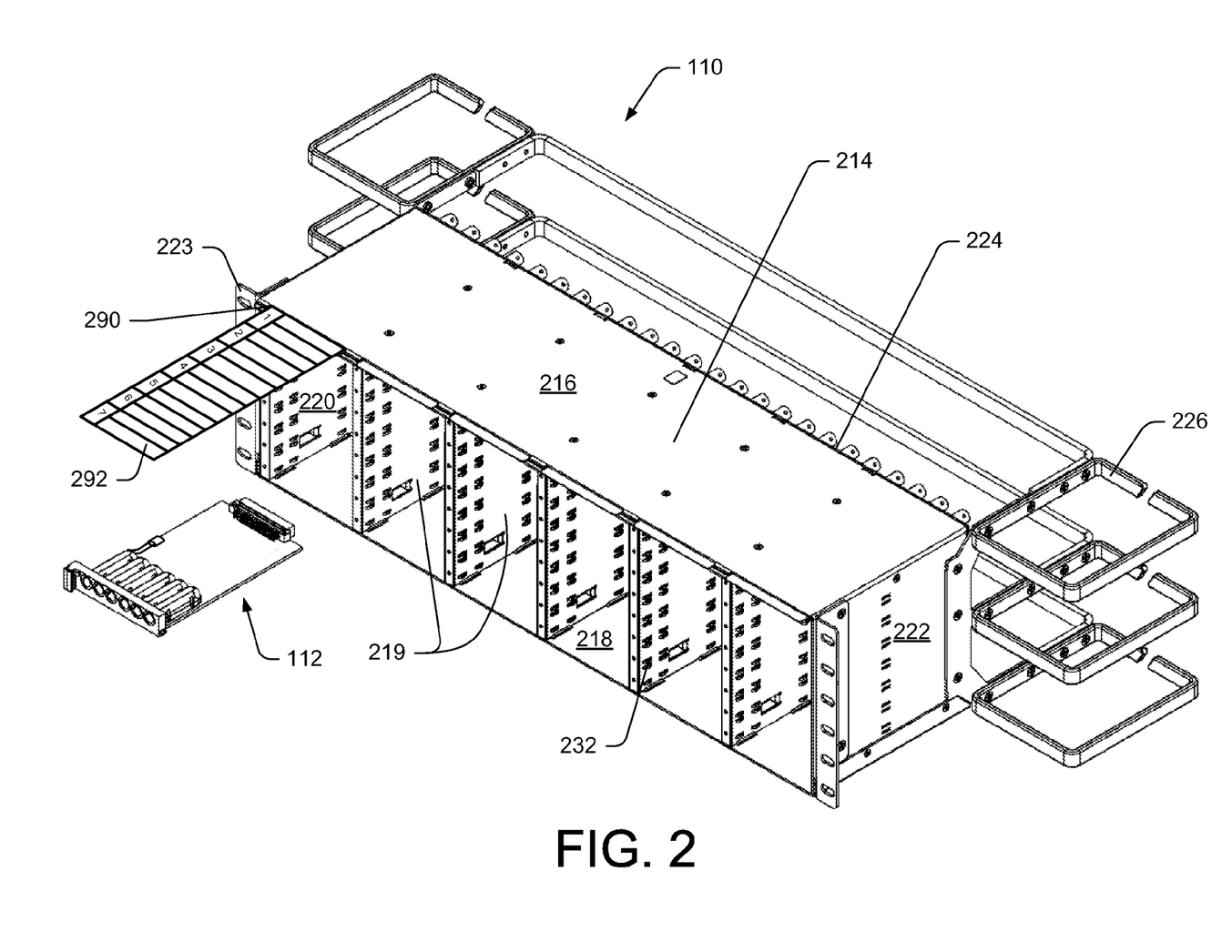
FIG. 2 is a schematic diagram showing the telecommunication panel of FIG. 1 with one of the DSX modules spaced from the panel.

FIG. 2 is a schematic diagram showing the telecommunication panel 110 of FIG. 1 with one of the DSX modules 112 spaced from the panel. The panel 110 has a panel chassis 214 that is elongated and is normally mounted horizontally between panel rack uprights (not shown). Chassis 214 may be either modular or non-modular. A modular chassis is one that is configured to receive individual telecommunication modules (or "modules"). Modules contain ports, which allow for, among other things, the cross-connecting of telecommunication equipment.

A modular chassis offers the benefit of greater customization, as individual modules can be purchased when additional circuits are desired. A non-modular chassis, however, is built and delivered fully loaded with the maximum number of circuits the chassis is designed to seat. Therefore, in a modular chassis a module may be inserted into and removed from a chassis depending on whether a user wishes to fully engage or disengage the module.

Normally a plurality of panels 110 are stacked one on top of another at a rack. Panel chassis 214 includes a top wall 216, a bottom wall 218, a side wall 220, a side wall 222, a back wall 224 and a plurality of interior walls 219. The interior walls 219 separate the chassis 214 into columns for receiving the modules 112. Under the top wall 216 for each column, there is a sleeve 290 for receiving an insertable designation card 292. The designation card 292 may be used by a technician or installer to designate the names and interconnections of the modules 112 in the column. The designation card 292 has a tab to be pulled at the front end, and two stoppers at the back end and on the sides of the designation card 292, so that the designation card 292 can be slid out but retained against being completely removed.

Rack mounting brackets 223 are affixed to the side walls 220, 222 to assist in mounting the telecommunication panel 110 to the rack uprights. The back wall 224 is attached to a panel backplane (not shown in this figure, see element 410 in FIG. 4) where the pieces of telecommunication equipment are terminated using wires, optical fibers, or other cables. The cables are normally supported by one or more cable managers 226 that extend from the back wall 224, side wall 222, or both.

The chassis 214 has an interior cavity or space with a large front opening for receiving a plurality of the insertable modules 112. The interior cavity is subdivided into module slots. The interior walls 219 have guide ribs 232 formed therein to guide and align the modules 112 in respective slots.

Figure 3:
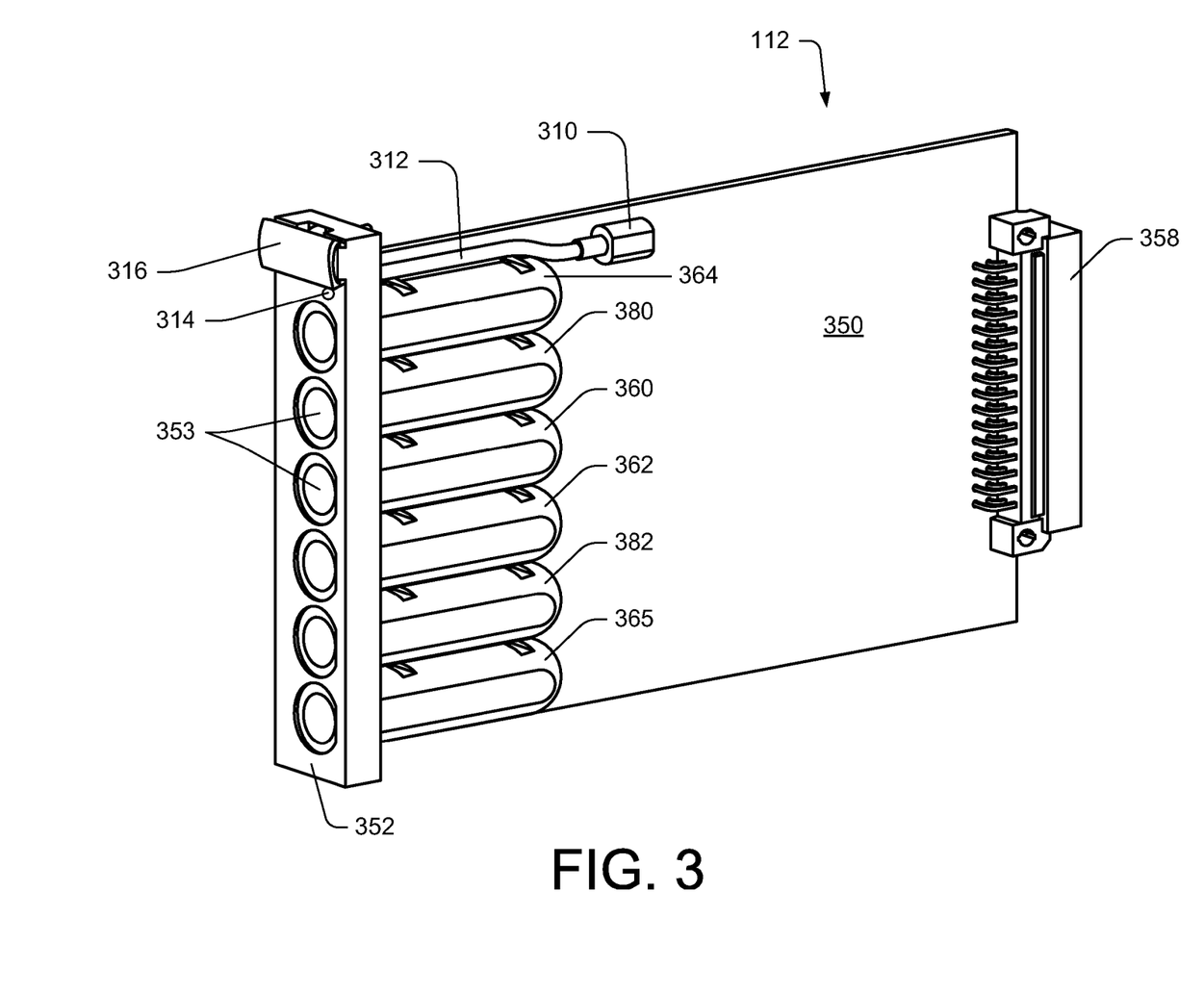
FIG. 3 is a schematic diagram showing an illustrative DSX module usable with the panel of FIG. 1.

FIG. 3 is a schematic diagram showing an illustrative DSX module 112 usable with the panel of FIG. 1. A detailed circuit diagram of the module 112 is described in the U.S. Pat. No. 5,546,282 entitled "Telecommunication network digital cross-connect panels having insertable modules with printed circuit board mounted coaxial jack switches," which is incorporated herein by reference in its entirety. Compared with the module disclosed in the U.S. Pat. No. 5,546,282, the modules 112 described in this application is more compact and has other features, including, for example, an added light-emitting diode (LED) light pipe as discussed below.

Each cross-connect module 112 has a housing with a multi-layer module printed circuit board 350 that extends from a front end of the housing to a rear end of the housing. A substrate other than the printed circuit board may also be used for electrical connection. The printed circuit board 350 includes conductive outer layers (not shown) that provide ground planes to minimize the transfer of stray signals that would interfere or compromise the transmission of the high rate digital signals.

The module housing includes a module face 352 mounted at the front end of the housing. The DSX module comprises a designation card 316 over the top of a fastener on the module face. The module face 352 has jack receiving apertures 353 formed therein at vertically spaced locations as illustrated in FIG. 3. Note, however, that when the modules are installed in the chassis of FIG. 2, the modules are disposed with the jack receiving apertures 353 arranged in a horizontal direction. A back surface of the module face 352 has a side slot (not shown) formed therein to receive the forward end of the module printed circuit board 350.

An elongated printed circuit board connector plug 358 is mounted on the rear end of the printed circuit board 350 for mating with a backplane connector (not shown in this figure, see element 444 in FIG. 4) when the module 112 is inserted into the chassis 214. In one embodiment, the connector plug 358 is a male Deutsches Institut für Normung (DIN) connector plug. Other connectors, such as Bayonet Neill-Concelman (BNC) connector plugs, may be used also. When a module 112 is properly inserted into a respective slot, the connector plug 358 is aligned and projects into the connector 444 to provide electrical interconnection between the jacks 360 and 362 and the backplane cable connectors (not shown in this figure, see elements 536, 538, 540 and 542 in FIG. 5).

The module 112 includes front mini-WECO jacks 360 and 362. Jack 360 is referred to as an input jack and jack 362 is referred to as an output jack. In this example, the module 112 includes two monitor jacks 364 and 365 for monitoring input and output cross-connect signals. In addition, the module 112 has an input cross-connect jack 380 and an output cross-connect jack 382 that are mounted at the front end of the module printed circuit board 350.

The module 112 also has an LED 310 mounted on the printed circuit board 350, a cover lens 314 disposed in the module face, and a light pipe 312 interposed between the LED and the cover lens to transmit light from the LED to the module face. A thin light pipe 312 is used, instead of directly placing an LED light on the module face 352, to reduce the width of the module measured across the printed circuit board 350 along the apertures 353. The cover lens 314 may be circular as shown in FIG. 3, or may have an oval shape to further reduce the module width needed. The cover lens 314 may also be placed at the corner of the module face, as shown in FIG. 3, to reduce the module width.

Each of the jacks 360, 362, 364, 365, 380, and 382 has a jack housing that is of a general cylindrical shape comprising a barrel with a plug opening (not shown) formed therein. The jack housing is affixed to the inside surface of the printed circuit board 350. Additionally, the jack housing has printed circuit board terminals that extend outward from the barrel for connecting with printed circuit ground plane conductors. Jacks 360, 362, 364, 365, 380, and 382 may also be directly mounted to the printed circuit board 350 for direct electrical connection.

In other embodiments, instead of or in addition to a printed circuit board like that shown in FIG. 3, the modules may include a housing with a plurality of coaxial or other wired connections coupling the jacks on the front surface to the connector plug (s) on the back surface of the modules.

Figure 4:
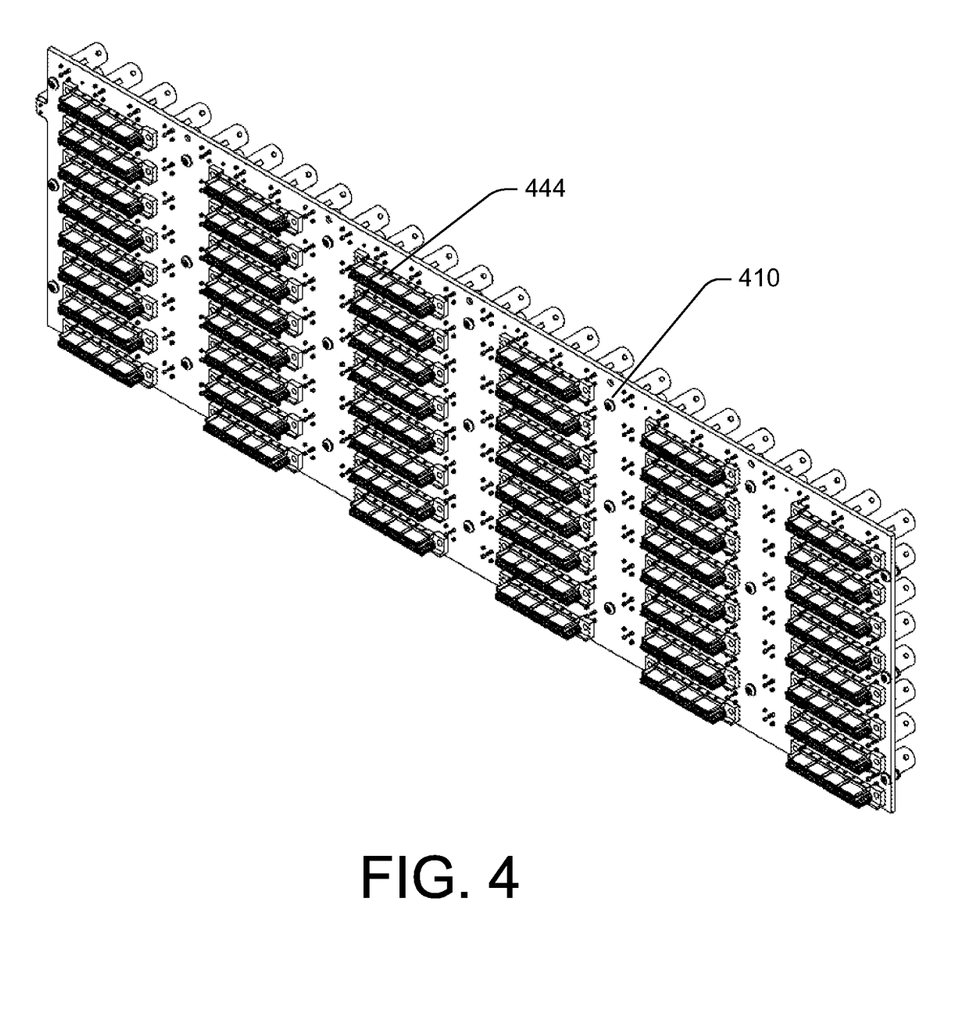
FIG. 4 is a schematic diagram showing a front view of a backplane.

FIG. 4 is a schematic diagram showing a front view of a backplane 410 which is attached to the back wall 224 of the panel 110. The front view shows a plurality of backplane connectors 444 mounted on the front facing side of the backplane 410 in an array for mating with the connectors 358.

Figure 5:
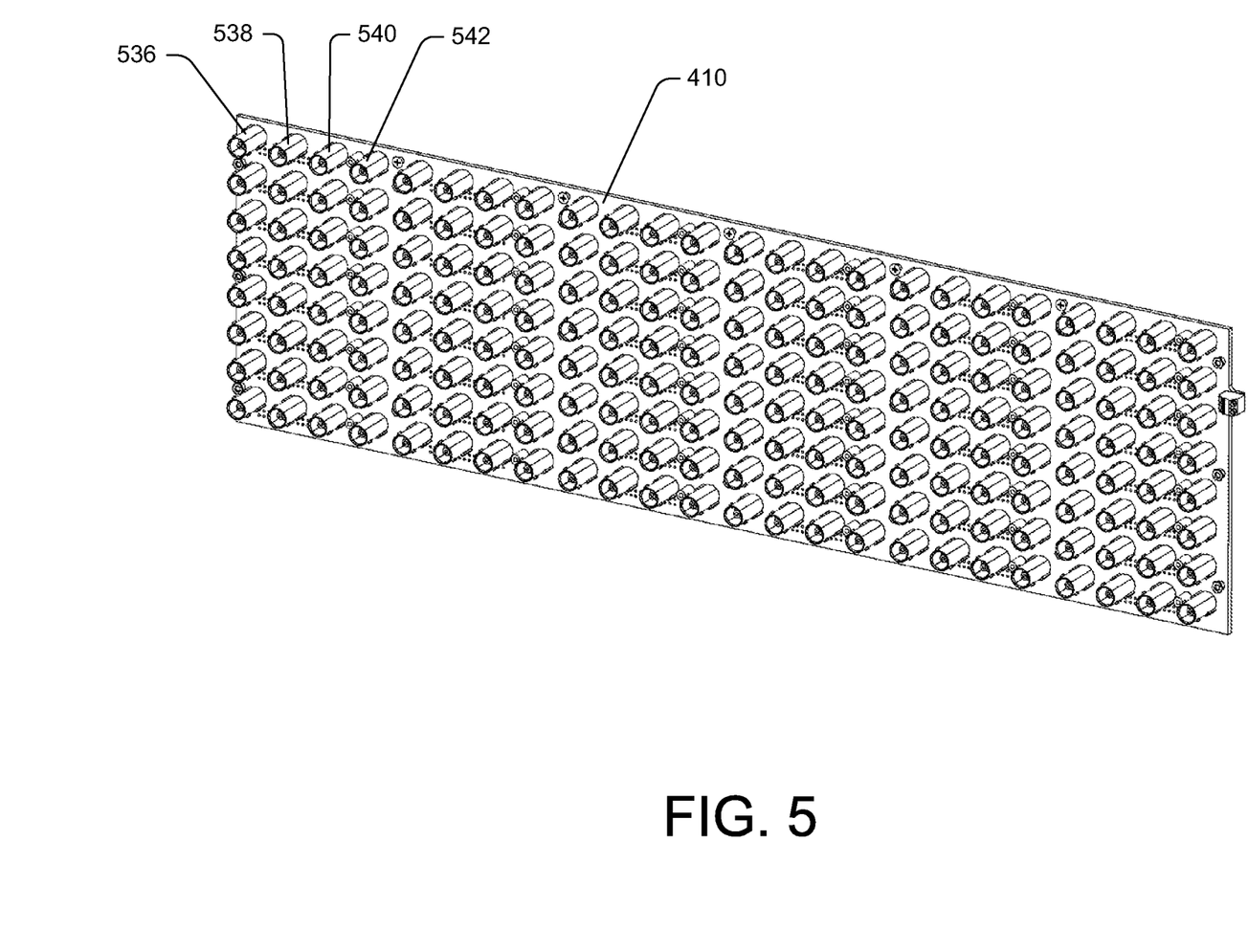
FIG. 5 is a schematic diagram showing a rear view of the backplane.

FIG. 5 is a schematic diagram showing a rear view of the backplane 410. The rear view shows cable connectors 536, 538, 540 and 542. Each row of four connectors (536, 538, 540 and 542) contains sufficient connections to terminate and interconnect at least two pieces of telecommunication equipment. Preferably each row of four connectors has a backplane input coaxial cable connector 536, a backplane output coaxial cable connector 538, an input cross-connect coaxial cable connector 540, and an output cross-connect coaxial cable connector 542. Each of the coaxial cable connectors 536, 538, 540 and 542 is affixed to the rear facing side of the backplane 410 and projects outward therefrom as illustrated in FIGS. 2 and 4. The cable connectors 536, 538, 540 and 542 may be BNC or TNC (threaded Neill-Concelman) cable connectors frequently referred to as installer cable connectors, or other suitable known connector types.

Two popular panel widths (measured including the widths of the chassis 214 and the two rack mounting brackets 223) are 19 inches and 23 inches. The chassis 214 designed here has a width of about 23 inches and a height of about 6 inches. The rack mounting brackets 223 have a width of about 0.75 inches each, and the backplane 410 has a width of about 21.5 inches. Therefore, the backplane surface has about 6*21.5=129 square inches. The chassis 214 is designed to receive 48 insertable 6-port DSX modules 112. Therefore, a ratio of the number of the insertable 6-port DSX modules to the backplane surface area of at least about 0.37 modules per square inch is achieved. By staggering backplane connectors or omitting LED lights, the chassis 214 may receive even more DSX modules, and a higher ratio of insertable 6-port DSX modules to backplane surface area may be achieved. Also, the chassis may be designed to hold other numbers of DSX modules, such as 12, 24, etc., as long as the density value is achieved.

Figure 6:
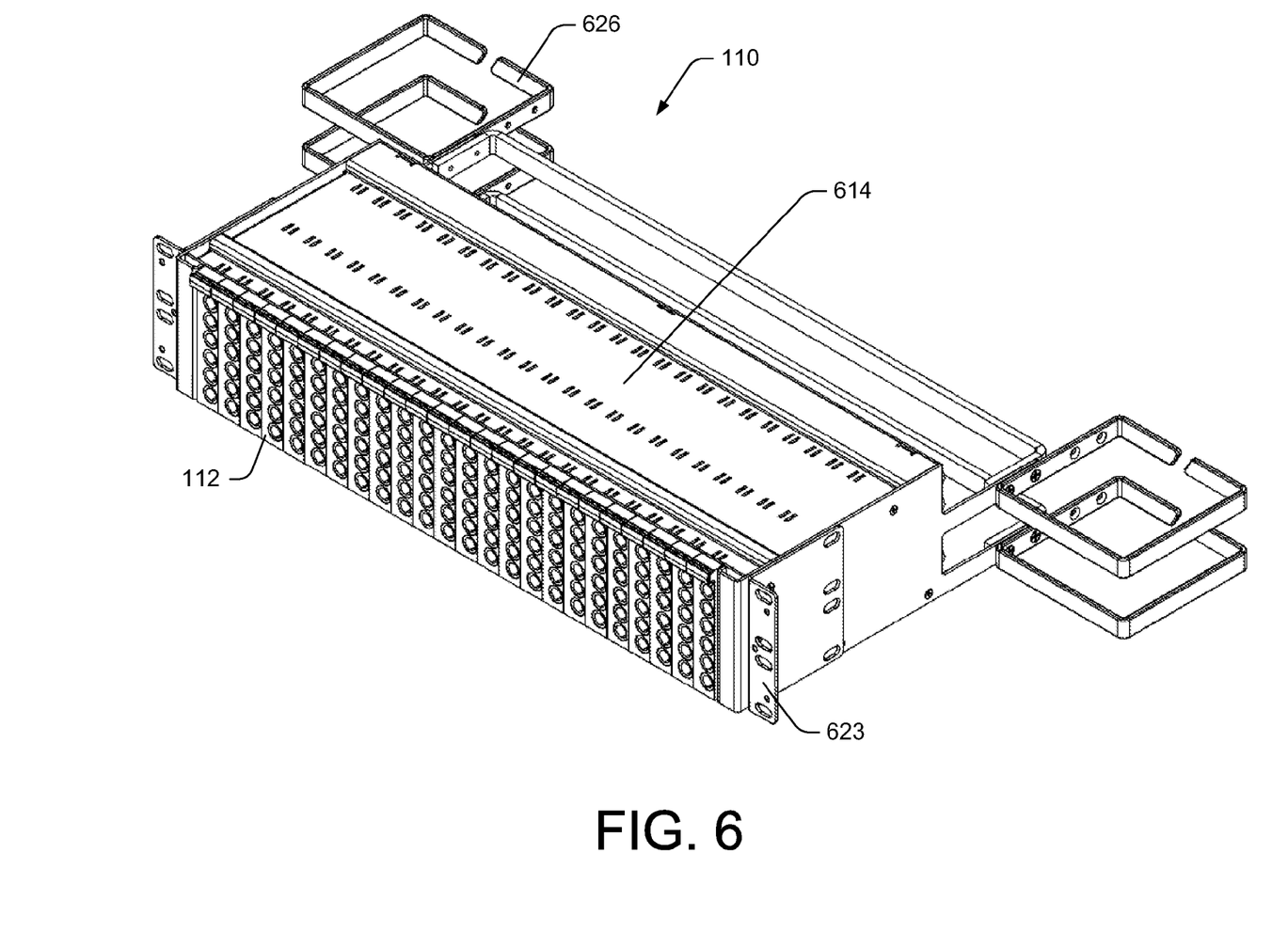
FIG. 6 is a schematic diagram showing another illustrative telecommunication panel with 24 DSX modules installed.

FIG. 6 is a schematic diagram showing another illustrative telecommunication panel 110 designed to hold 24 DSX modules 112. The chassis 614 designed here has a width of about 19 inches and a height of about 3.5 inches. The rack mounting brackets 623 has a width of about 0.8 inches, and the backplane has a width of about 17.4 inches. Therefore, the backplane surface has about 3.5*17.4=60.9 square inches. The chassis 614 is designed to receive 24 insertable 6-port DSX modules 112. Therefore, a ratio of the number of the insertable 6-port DSX modules to the backplane surface area of at least about 0.39 modules per square inch is achieved.

CONCLUSION

Although implementations have been described in language specific to structural features and/or methodological acts, it is to be understood that the invention is not necessarily limited to the specific features or acts described. Rather, the specific features and acts are disclosed as illustrative forms of implementing the invention.

What is claimed is:

1. A telecommunication apparatus comprising:
    a chassis configured to receive Digital Signal Cross-connect (DSX) modules;
    a plurality of 6-port DSX modules received in the chassis; and
    a backplane connected to the chassis, wherein a ratio of the number of the 6-port DSX modules to a surface area of the backplane is at least about 0.37 modules per square inch.

2. The telecommunication apparatus of claim 1, wherein each of the 6-port DSX modules comprises:
    a substantially planar module face;
    a substantially planar printed circuit board connected to the module face with the printed circuit board being substantially perpendicular to the module face; and
    jacks on the module face, wherein the printed circuit board is in parallel to a top surface of the chassis.

3. The telecommunication apparatus of claim 2, wherein each of the 6-port DSX modules further comprises:
    a light emitting diode (LED) on the printed circuit board;
    a cover lens disposed in the module face; and
    a light pipe interposed between the LED and the cover lens to transmit light from the LED to the module face.

4. The telecommunication apparatus of claim 2, wherein each of the 6-port DSX modules further comprises a Deutsches Institut für Normung (DIN) connector mounted to the printed circuit board.

5. The telecommunication apparatus of claim 1, wherein each of the 6-port DSX modules comprises:
    a substantially planar module face; and
    a set of jacks on the module face, wherein and the set of jacks is in parallel to a top surface of the chassis.

6. The telecommunication apparatus of claim 1, wherein the chassis has a top surface comprising a slot configured to receive an insertable designation card.

7. The telecommunication apparatus of claim 6, further comprising a designation card slidably received in the slot in the chassis.

8. The telecommunication apparatus of claim 1, wherein the chassis has a height of about 6 inches.

9. The telecommunication apparatus of claim 8, wherein the chassis has a width of about 23 inches.

10. The telecommunication apparatus of claim 8, wherein the plurality of 6-port DSX modules comprises 48 modules.

11. The telecommunication apparatus of claim 1, wherein the plurality of 6-port DSX modules comprises 24 modules.

12. A telecommunication apparatus comprising:
    a chassis configured to receive 48 insertable 6-port Digital Signal Cross-connect (DSX) modules;
    a backplane connected to the chassis, wherein the backplane has a height of at most about 6 inches, and
    wherein a ratio of the 48 insertable 6-port DSX modules the chassis is configured to receive to a surface area of the backplane is at least about 0.37 modules per square inch.

13. The telecommunication apparatus of claim 12, wherein the backplane has a width of at most about 23 inches.

14. The telecommunication apparatus of claim 12, wherein the chassis has 6 columns and each column is configured to receive 8 insertable 6-port DSX modules.

15. The telecommunication apparatus of 12, further comprising a plurality of 6-port DSX modules, each of the 6-port DSX modules comprising:
- a substantially planar module face;
- a substantially planar printed circuit board connected to the module face with the printed circuit board being substantially perpendicular to the module face; and
- jacks on the module face, wherein the printed circuit board is in parallel to a top surface of the chassis.

16. The telecommunication apparatus of claim 15, wherein each of the 6-port DSX modules further comprises:
- a light emitting diode (LED) on the printed circuit board;
- a cover lens disposed in the module face; and
- a light pipe interposed between the LED and the cover lens to transmit light from the LED to the module face.

17. The telecommunication apparatus of claim 12, further comprising a plurality of 6-port DSX modules, each of the 6-port DSX modules comprising:
- a substantially planar module face; and
- a set of jacks on the module face, wherein and the set of jacks is in parallel to a top surface of the chassis.

18. The telecommunication apparatus of claim 12, wherein the chassis has a top surface comprising a slot configured to receive an insertable designation card.

19. The telecommunication apparatus of claim 18, further comprising a designation card slidably received in the slot in the chassis.

20. A telecommunication apparatus comprising:
- a chassis configured to receive twenty four 6-port Digital Signal Cross-connect (DSX) modules; and
- a backplane connected to the chassis, wherein a ratio of the number of the 6-port DSX modules to a surface area of the backplane is at least about 0.39 modules per square inch.

21. The telecommunication apparatus of claim 20, wherein each of the 6-port DSX modules comprises:
- a substantially planar module face;
- a substantially planar printed circuit board connected to the module face with the printed circuit board being substantially perpendicular to the module face; and
- jacks on the module face, wherein the printed circuit board is perpendicular to a top surface of the chassis.

22. The telecommunication apparatus of claim 21, wherein each of the 6-port DSX modules further comprises a Deutsches Institut für Normung (DIN) connector mounted to the printed circuit board.

23. The telecommunication apparatus of claim 21, wherein each of the 6-port DSX modules further comprises:
- a light emitting diode (LED) on the printed circuit board;
- a cover lens disposed in the module face; and
- a light pipe interposed between the LED and the cover lens to transmit light from the LED to the module face.

24. The telecommunication apparatus of claim 20, wherein each of the 6-port DSX modules comprises:
- a substantially planar module face; and
- a set of jacks on the module face, wherein and the set of jacks is perpendicular to a top surface of the chassis.

25. The telecommunication apparatus of claim 20, further comprising a designation card over the top of a fastener on the module face.

26. The telecommunication apparatus of claim 20, wherein the chassis has a height of about 3.5 inches.

27. The telecommunication apparatus of claim 26, wherein the chassis has a width of about 19 inches.

* * * * *